(No Model.)   2 Sheets—Sheet 2.

T. SHAW.
APPARATUS FOR PURIFYING WATER.

No. 457,917.  Patented Aug. 18, 1891.

UNITED STATES PATENT OFFICE.

THOMAS SHAW, OF PHILADELPHIA, PENNSYLVANIA.

APPARATUS FOR PURIFYING WATER.

SPECIFICATION forming part of Letters Patent No. 457,917, dated August 18, 1891.

Application filed October 27, 1890. Serial No. 369,447. (No model.)

*To all whom it may concern:*

Be it known that I, THOMAS SHAW, mechanical engineer, of the city and county of Philadelphia, Pennsylvania, have invented a new and Improved Apparatus for Purifying Water, to be used in the manufacture of ice; and I hereby declare the following to be a full, clear, and exact description of the same, reference being had to the accompanying drawings, and to the letters of reference marked thereon.

My invention consists in apparatus employed for the removal of excess of absorbed gases contained in the water.

The object of the invention is, by the addition of this apparatus, to produce transparent ice in the ordinary freezing processes now in use.

In order to enable others to use and practice my invention, I will proceed to describe its construction and operation.

Figure 1:
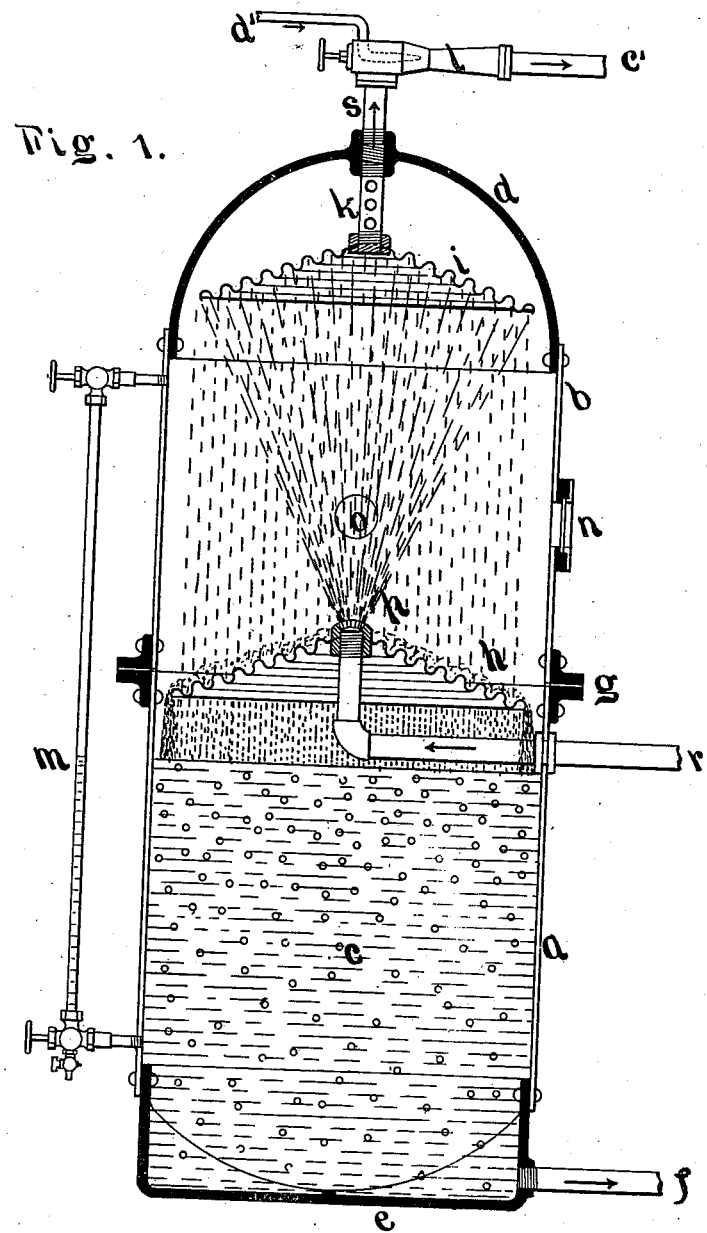
Figure 2:
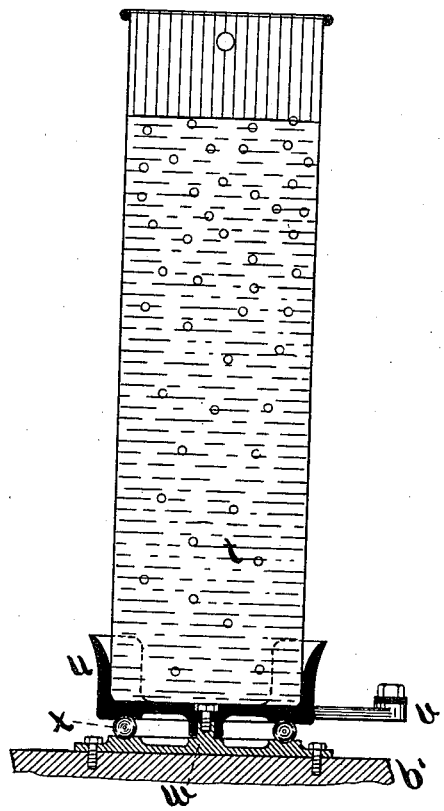
Figure 3:
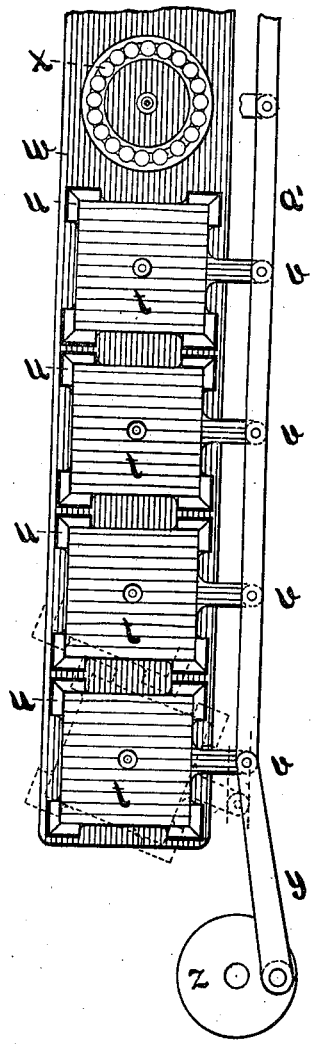

On reference to the accompanying drawings, which form part of this specification, Figure 1 represents the means employed of removing gases by complete or partial vacuum, operated in the manner and for the purpose hereinafter described. Fig. 2 represents the means employed for the removal of gases at low temperatures in the act of congealing.
Fig. 3 is a top plan view of the means shown in Fig. 2.

Similar letters refer to similar parts, of which—

$a$, Fig. 1, is a vertical cylinder constructed of ordinary boiler-iron, provided with ordinary cast-iron heads $d$ $e$, top and bottom. The said cylinder is parted in the middle and provided with ordinary flanges $g$ to enable access to the interior, and is provided with ordinary water-gage $m$ and outlet-pipe $f$ for exit of water, and pipe $r$ for inlet of water, and pipe $s$, provided with perforations $k$ in the portion included in the cylinder, for exit of air or other gas through vacuum induced by steam-ejector $l$. Corrugated cone-shaped disk $i$ is provided to arrest the spray of water ejected upward from spray-nozzle $p$, and corrugated disk $h$ is arranged to expose large area of water to the action of the vacuum, all operating in the manner hereinafter described. Peep-holes covered with glass are provided at $n$ and $o$, one for illumination and the other for observation of internal operation.

Fig. 2 shows the ordinary freezing-can mounted on vibrating cast-iron base $u$, supported on anti-friction rollers $x$, supported on metal base shown, and secured to bottom of brine-tank $b'$. A central screw-bolt $w$ secures the concentric position of vibrating base $u$, and a projecting lever $v$ enables attachment of pitman-rod $y$, Fig. 3, to ordinary crank-disk $z$, revolved on vertical shaft from a source of power.

Fig. 3 shows a series of cans $t$ on top view, all connected with one revolving crank-disk. The dotted lines show limit of vibration in one direction. The ordinary friction-balls $x$, Fig. 3, are shown from top view.

The purification of water in connection with the production of ice is as follows:

Ordinary fresh waters have capacity for absorbing gases of every character, principally constituents of air and $CO_2$ in pure waters; but every other gas from what are considered foul sources are liberally absorbed by waters when brought in contact with same. These gases are liberated more or less in the act of freezing, and are held in small globules suspended in the mass, giving the ice a white translucent appearance that is deemed undesirable by the consumer and others, which greatly lessens its value, and this, coupled with the damaging effect of foul gases accumulating in the center of the mass, renders the ice often unfit for household use, and it is for the purpose of removing these defects that the mechanisms described herein are provided.

The sole object of the device shown in Fig. 1 is for the removal of gases from waters intended for conversion into ice, and the operation is started with the cylinder $a$ empty of fluid contents; and the first act in the operation is to start the ordinary air-ejector $l$ by turning on steam from a steam-boiler to pipe $d'$, which induces a vacuum of twenty-two to twenty-four inches of mercury, and the air and gas in cylinder $a$ enter apertures $k$ and flow through pipe $s$ to exit-pipe $s'$ to the outer air.

The measure of partial vacuum is indicated by an ordinary gage. (Not shown.) Twenty-four inches give a good result, and good results in a less degree are obtained from less vacuum.

The water to be used is permitted to enter pipe $r$ from any tank or reservoir. The induced vacuum causes the water to spray upward from perforated nozzle $p$ until it is brought in contact with corrugated disk $h$, from whence the water rains down upon corrugated disk $h$, where the water flows from the several corrugations over the edge into waters $c$, accumulated for instant use in ice-manufacture. While this spraying action is going on the previously-absorbed gases contained in the waters are now liberated from the globules composing the spray, and from the waters flowing over disk $h$ and from the water in tank $c$, all of which gases are ejected through pipe $s$ in the manner aforedescribed. The action of the spray is observed by the operator at peep-hole $n$, when spray is illuminated by light from peep-hole $o$. The height of water in the cylinder is observed on water-gage $m$. The operation is of a continuous character. The water, filtered more or less, free from gases, is drawn off at $f$ for ice-manufacture, and fresh supplies of water are supplied constantly for the operation aforedescribed through pipe $r$. After the waters are removed from pipe $f$ the absorption of gases recommences, and to remove the last remaining portion of air the device shown in Figs. 2 and 3 is provided. The purpose of the operation in the mechanism here shown is to keep the water more or less agitated during the act of freezing, which is accomplished in this wise: the metal base $u$ supports the can $t$, that contains the water to be frozen, immersed in the usual freezing-fluids, the temperatures of which are lowered by any of the well-known methods now in use. The vibration or partial rotation of the cans of twenty strokes (more or less) per minute, induced by crank-disk $z$, as aforedescribed, causes the water in the can to slush back and forth and induces agitation sufficient to prevent the gas-globules from adhering to the ice in process of formation and causes the gases to rise to the top, producing as a final result transparent ice of the highest merchantable character at a slight additional expense, on account of running the water through the process described.

Much of the apparatus can be dispensed with where the maximum results are not desired. For example, the device in Figs. 2 and 3 can be operated independent of the device shown in Fig. 1, where moderate results are desired. The device in Fig. 1 can be operated independent of the device shown in Figs. 2 and 3.

It will be evident that the several parts can be considerably modified without any alteration in the result, and that the ejector $l$ may be substituted by any ordinary air-pump. I therefore do not wish to confine myself to the exact mechanism herein set forth.

What I do claim, and desire to secure by Letters Patent, is—

1. The combination, with the cylinder, of an ejector connected to the upper portion thereof and having a perforated pipe extending therein, an inlet-pipe projecting into the cylinder, and a corrugated cone-shaped disk connected to the ejector-pipe, against which the water is sprayed, substantially as described.

2. The combination, with the tank, of an ejector attached to the upper portion thereof and having a perforated pipe extending into the cylinder, a corrugated cone-shaped disk secured to the end of the pipe, an inlet-pipe extending centrally into the chamber and having an upwardly-extending nozzle, a corrugated cone-shaped disk secured to the nozzle, and an exit-pipe at the bottom of the chamber for the purified water, substantially as described.

3. The combination, with the support, of the bases pivotally mounted thereon, cans resting in said bases, and means for oscillating said bases on their supports, substantially as described.

4. The combination, with the support, of the bases pivotally secured thereto, the friction-balls interposed between the bases and supports, cans mounted on the bases, a shaft connected to the bases, and means for oscillating the bases, substantially as described.

THOMAS SHAW.

Witnesses:
JOSEPH R. WILSON,
J. LOGAN FITTS.